March 22, 1966 G. M. MAGRUM 3,241,396
VIBRATION DAMPER
Filed Aug. 23, 1963
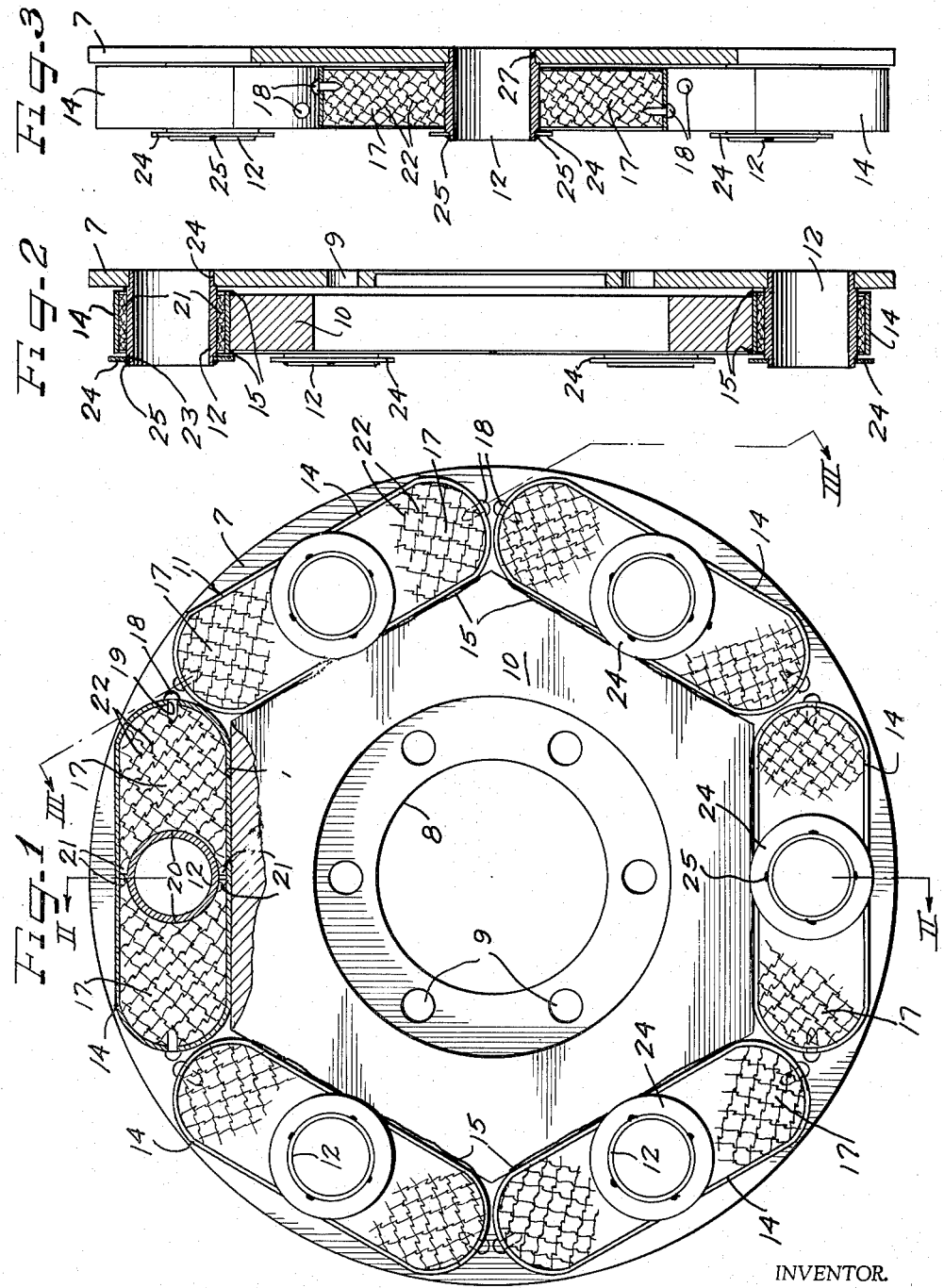
INVENTOR.
Gervase M. Magrum
BY
Hill, Sherman, Meroni, Gross & Simpson
ATTORNEYS

United States Patent Office 3,241,396
Patented Mar. 22, 1966

3,241,396
VIBRATION DAMPER
Gervase M. Magrum, Williamsville, N.Y., assignor to Houdaille Industries, Inc., Buffalo, N.Y., a corporation of Michigan
Filed Aug. 23, 1963, Ser. No. 304,078
11 Claims. (Cl. 74—574)

This invention relates to improvements in vibration dampers and more particularly concerns dampers especially suitable for energy absorption in torsional excitations of rotating masses, although it also has linear damping capabilities.

In mechanical vibration dampers, as distinguished from viscous dampers wherein a coupling between the damper housing and inertia mass comprises a viscous liquid, various problems have been encountered such as lack of economical production, short life, environmental instability, etc. For example, in dampers utilizing elastomers it is difficult to attain standardization because of variations in the physical characteristics experienced in different elastomer compound batches due to chemical and molding differences. Adjustments for both metal springs and elastomers to compensate for physical and dimensional variations require fairly expensive fabrication techniques and assembly methods in order that uniformity of results may be achieved in production. Elastomers, of course, suffer deterioration from aging, overheating, and other environmental conditions.

Accordingly, an important object of the present invention is to provide a vibration damper construction, especially adapted for torsional vibration dampers which is simple in adaptability of design, economical to manufacture, of continuing reliability and environmental immunity, and the like.

Another object of the invention is to provide a new and improved vibration damper construction free from close tolerances and time-consuming and costly machining.

A further object of the invention is to provide a novel vibration damper which is adapted to be made by press-forming and welding techniques of manufacture.

Still another object of the invention is to provide a new vibration damper construction in which a novel cushion coupling is provided between the hub or carrier portion and the inertia mass portion of the damper unit.

A still further object of the invention is to provide a novel spring and damping device for vibration dampers and comprising a packed mass of stranded material, and more particularly a knitted wire cushion affording not only a highly resilient coupling medium but an efficient energy absorbing device.

A yet further object of the invention is to provide a new and improved tuned vibration damper construction.

Other objects, features and advantages of the present invention will be readily apparent from the following detailed description of a preferred embodiment thereof, taken in conjunction with the accompanying drawing, in which:

FIGURE 1 is a front elevational view of the damper;
FIGURE 2 is a sectional detail view taken substantially on the line II—II of FIGURE 1; and
FIGURE 3 is a fragmentary sectional elevational view taken substantially on the line III—III of FIGURE 1.

Although in the example chosen for illustration a torsional vibration damper 5 is disclosed, it will be readily apparent that the principles of this invention are equally as well adaptable to linear vibration dampers, oscillating vibration dampers, and the like.

In the exemplary form of rotary vibration damper 5, the arrangement is of the type which is readily adapted for damping torsional vibrations of an automative vehicle crankshaft, such as the crankshaft of an automobile. To this end, the damper 5 comprises a supporting disk and hub member 7 having a central opening 8 for concentric reception of a shaft (not shown) therethrough and to which the hub portion of the disk 7 is adapted to be rigidly secured as by means of screws (not shown) accommodated through screw holes 9. Thereby, the mounting disk 7 will be mounted corotatable with the shaft (or other member or mass subject to torsional vibrations).

Mounted on the supporting member disk 7 is an inertia member 10 of generally ring form having on one periphery, herein its outer periphery, a uniform circumferentially disposed series of resilient coupling and damping devices 11 connected to the supporting disk 7 by means comprising studs 12 which project rigidly from one face of the supporting disk. Where desirable for tuning purposes, the coupling cushion assemblies 11 may be mounted on the inner perimeter of the inertia member 10, or between two inertia rings, one at the outer perimeter and one at the inner perimeter. Further, if preferred, it will be apparent that the coupling assemblies 11 may be connected within openings in an inertia mass of a preferred size.

In the exemplary form of the damper 5, the inertia ring 10 has its inner diameter of a size to clear the hub portion of the supporting disk 7, while the outer perimeter of the inertia ring is of polygonal, and in this instance hexagonal, shape providing outer perimeter straight edge areas 13. Integrally attached to at least some of these edges 13 are containers or receptacles 14 of the coupling cushioning assemblies 11. These comprise generally oblong frames having their ends preferably of arcuate shape. Each of the receptacle frames 14 may be constructed from strip metal such as strip steel or may be a stamping and providing a depth of receptacle slightly greater than the thickness of the inertia ring 10. Thereby, as best seen in FIGURE 2, at least one edge portion and preferably both edge portions of the side of the receptacle frame engaging the associated flywheel ring edge 13 will project slightly beyond the adjacent face of the flywheel member 10. This enables thorough linear welding of the receptacle, as by means of bead welding 15, along at least one and preferably each side of the joint between the edge area 13 and the contiguous receptacle side. In the illustrated instance, the receptacles 14 are of a length maximum to the length of the associated engaged flywheel edge areas 13, wherein the arcuate ends of the receptacles are closely adjacent to one another, although for tuning or other purposes all or some of the receptacles may be shorter or longer.

Within each of the receptable frames 14, and between the opposed coupling surfaces rigidly on the damper member 7 and 10 as afforded by the studs 12 and the frames 14, the receptacle area, volume or pocket is predetermined to receive coupling and damping cushions 17 having spring characteristics calculated to afford the tuned relation preferred or required in the damper to meet the known or potential vibrational amplitude or range or amplitudes in the excited mass or apparatus with which the damper is to be used. In a desirable form, a pair of substantially identical cushions 17 is mounted in each of the receptacles 14, each shaped complementally to fit firmly within one-half of the receptacle 14 and suitably retained against displacement from either of the opposite open sides of the receptacle by means such as retaining pins 18 which are driven through suitable respective apertures 19 in the curved end wall portions of the receptacle members. In thickness, the cushions 17 are preferably slightly less than the depth of the receptacle so that the opposite exposed faces of the cushions are protected within the planes of the edges of the walls defining the receptacles.

In order to effect a cushioning and damping connection with the studs 12, the opposing, inner end portions of the cushions 17 are provided with stud-engaging, complementary centered bearing recesses 20. In this instance, with the outer perimeter of the studs 12 cylindrical, the bearing recesses 20 are semi-cylindrical and of a depth to afford furcation legs 21 the tips of which are closely adjacent to the tips of the companion cushion 17 in each instance. Through this arrangement, and by having the engaged diameter of the studs 12 sufficiently smaller than the inside width of the receptacle frame 14 to accommodate furcations 21 of sufficient mass a fully cushioned, spaced relationship of the studs and the walls of the receptacle frame is maintained, with the major axis of the cushions 17 extending in the direction of major, torsional vibrational movements and the minor axis extending across the studs 11 affording at least some cushioning for damping eccentric vibrations.

According to the present invention, the coupling and damping cushions 17 comprise frictionally interengaged strand material 22 packed in a prestressed mass. Knitted material and more particularly knitted wire is preferred, utilizing a knitted wire cloth for the purpose. Steel wire is excellent for the purpose. Such material enables the provision of a substantial range of operational characteristics both in the spring and damping actions depending upon the diameter and number of wires in each warp and woof of the knitted cloth, the density of the pack, the finish or coating on the wire, the metallurgical properties of the wire, the amount of prestress in assembly, etc. Knitted wire thus affords the criteria for efficient tuned vibration damping. The knitted wire cushions contain large numbers of closely confined small wires, so that any deflection of the cushion material displaces each wire from each other with a resulting rubbing frictional, energy absorbing action. In the illustrated example, the direction of compression of the cushions 17 is on their major axis, that is lengthwise of the receptacles 14, for effective torsional vibration cushioning and damping.

For convenience in assembling the cushions 17 about the studs 12, the outer end portions of the suds, that is the ends remote from the mounting disk 7, are normally free from circumferential obstruction but provided with external rabbet groove 23. Thereby, after the cushions 17 have been assembled about the studs retaining means in the form of respective washers 24, of a diameter to overlap retainingly the adjacent edges of the associated receptacle frame 14, can be fitted onto the rabbet shoulders and suitably secured to the studs as by spot welds 25. Although the studs 12 may, if desired, be solid pins they may conveniently be in the form of tubular pieces, as shown, having their inner ends attached in any suitable manner as by welding or otherwise within suitable apertures 27 provided in the mounting plate 7.

When the torsional vibration damper 5 is rigidly attached by its hub to an excited mass, as for instance to the chrankshaft of an internal combustion engine, vibrations generated in the crankshaft are transferred through the hub and the disk 7 to the combined tuning and damping assembly which, in this instance, comprises the inertia mass or flywheel 10 and the resilient coupling, damping cushion assemblies 11. By proper design, the tuning of the assembly is to afford a frequency which is a percentage of the engine's natural frequency. Thus, when the engine crankshaft is excited at one of its several critical speeds in one frequency, the excitation is transferred in a highly efficient manner to the inertia mass and spring cushion system. As a result, cyclic variations in torsion, superimposed on crankshaft rotation, are eliminated and transferred to the inertia mass with magnification. Further, friction damping is introduced into the spring cushion elements 17 to restrict excursions of the crankshaft to reduce its stress, and thereby substantially prolong crankshaft life.

It will be observed that by the arrangement wherein the coupling and cushion assemblies 11 are not only disposed on a circle concentric with the axis of rotation of the damper, but are also disposed on lines wherein the principal axes of diametrically opposite coupling and cushioning assemblies 11 are in parallel relation, effective linear as well as torsional vibration damping is accomplished whereby in crankshaft damping not only torsional but also eccentric vibations are damped. As a matter of fact, where only or primarily linear vibrations are to be damped, the coupling and cushioning assemblies 11 are mounted with their major damping axis in line with the linear vibrations to be damped.

Although in the exemplary form of the invention disclosed in the drawing, the receptacles or pocket members 14 which envelope the cushions are shown as separately formed but integrally attached members, they could comprise integral parts of the inertia mass 10 as for example parts of an integral casting. The number, size and shape of the coupling and cushion assemblies 11 can be proportioned to meet the requirements of the excited mass and permissible space. Where a more compact, smaller outside diameter arrangement is required, the coupling, damping cushion assemblies 11 may be arranged in a plurality of circumferential rows with a graduated number of the assemblies per row. Thus, a large variety of adaptations are possible within the principles of the present invention.

It will be understood that modifications and variations may be effected without departing from the scope of the novel concepts of the present invention.

I claim as my invention:

1. A vibration damper including load-free inertia mass part and a part adapted for attachment to a member subject to vibrations, the improvement comprising means for relatively movably connecting said parts and including opposed surfaces on said parts, respectively, and prestressed knitted steel wire cushions engaged by and between said surfaces.

2. A torsional coupling comprising a pair of relatively torsionally movable members, said members having means providing a plurality of rigid coupling pockets on one of the members defined by walls and coupling elements projecting rigidly from the other of the members into the pockets in spaced relation to said walls, and coupling cushions of packed masses of resilient strand material in said pockets and engaging said walls and said coupling elements and normally maintaining said spaced relation.

3. Torsional coupling means for relatively torsionally displaceable members comprising, means on one of the members defining a pocket, a stud on the other of the members projecting into the pocket, and a packed mass of resilient strand material providing a cushion between said stud and the walls defining the pocket.

4. A torsional coupling between a pair of torsionally displaceable members comprising, means on one of the members defining an elongated pocket oriented generally in the rotary drection of the members, a stud on the other of the members projecting across the longitudinal axis of and into said pocket intermediate the ends of the pocket, and respective coactive coupling cushions filling the pocket at each side of and engaging said stud.

5. A torsional coupling between a pair of torsionally displaceable members comprising, means on one of the members defining an elongated pocket oriented generally in the rotary direction of the members, a stud on the other of the members projecting across the longitudinal axis of and into said pocket intermediate the ends of the pocket, and a pair of formed, pre-stressed coupling cushions of knitted steel wire disposed in opposed relation within the pocket and engaging the stud therebetween.

6. A combination torsional and linear vibration damper comprising a mounting member providing a hub portion for attachment to a rotary mass to be damped, an inertia member concentric with the mounting member, one of said members having a plurality of circumferentially spaced pockets, the other of said members having respective studs projecting into said pockets, and coupling and damping cushions in said pockets and engaging said studs permitting relative vibrational movement of the members but acting to maintain the same normally in predetermined relative disposition.

7. A damper of the character described comprising, in combination, a pair of relatively displaceable members, one of said members being adapted to be attached to a machine part or the like subject to vibrations requiring damping and the other of the members comprising an inertia mass, means on one of the members defining coupling receptacles, means on the other of the members comprising coupling studs engageable in spaced relation within the receptacles, preformed coupling and vibration damping cushions of knitted wire cloth mounted within said receptacles and engaging said studs, means retaining the cushions within the receptacles, and means on the studs retaining the members in assembled relation.

8. A torsional vibration damper comprising a mounting member, a flywheel member having a hexagonal perimeter, a generally oblong receptacle extending lengthwise on at least certain of the edges of the hexagonal perimeter in symmetrical relation, studs projecting from one side of the attachment member into said receptacles, and a pair of preformed substantially identical cushions engaging in the respective ends of each of the receptacles and having opposing end portions engaging the stud therebetween in bearing relation.

9. A vibration damper comprising, in combination, a member to be attached to a mass subject to vibrations to be damped;

a load-free inertia member;

opposed surfaces fixedly on said members, respectively, and movable toward one another on movement of the members toward one another; and a combination coupling and damping cushion compressibly engaged by and between said surfaces and comprising a compact prestressed mass of rubbingly interengaging strand material in which the strands interact frictionally to absorb energy in response to vibrations effecting relative movement of the members toward one another to compress said cushion.

10. A damper as defined in claim 9, in which said strand material comprises knitted cloth.

11. A damper as defined in claim 9, in which said strand material comprises knitted wire cloth.

References Cited by the Examiner

UNITED STATES PATENTS

| | | | |
|---|---|---|---|
| 1,483,561 | 2/1924 | Ungar | 64—12 |
| 2,944,844 | 7/1960 | Miller | 64—11 |
| 3,165,945 | 1/1965 | Magrum | 74—574 |

BROUGHTON B. DURHAM, *Primary Examiner.*

W. S. RATLIFF, Jr., *Assistant Examiner.*